United States Patent
Huang et al.

(10) Patent No.: US 12,054,853 B2
(45) Date of Patent: Aug. 6, 2024

(54) MODIFIED POLYESTER STAPLE FIBER AND PREPARATION METHOD THEREOF

(71) Applicant: BESTEE MATERIAL (TSINGTAO) CO., LTD., Qingdao (CN)

(72) Inventors: Xiaohua Huang, Qingdao (CN); Guangwei Fu, Qingdao (CN); Bingwei Wang, Qingdao (CN); Weihua Mu, Qingdao (CN); Yu Liu, Qingdao (CN); Yijun Jiang, Qingdao (CN); Li Zhen, Qingdao (CN); Jianli Liu, Qingdao (CN)

(73) Assignee: BESTEE MATERIAL (TSINGTAO) CO., LTD., Qingdao (CN)

( * ) Notice: Subject to any disclaimer, the term of this patent is extended or adjusted under 35 U.S.C. 154(b) by 419 days.

(21) Appl. No.: 17/231,189

(22) Filed: Apr. 15, 2021

(65) Prior Publication Data
US 2021/0324542 A1 Oct. 21, 2021

(30) Foreign Application Priority Data

Apr. 17, 2020 (CN) .......................... 202010303564.8

(51) Int. Cl.
| | |
|---|---|
| *D01F 1/10* | (2006.01) |
| *D01D 5/08* | (2006.01) |
| *D01D 5/26* | (2006.01) |
| *D01F 6/62* | (2006.01) |
| *B82Y 30/00* | (2011.01) |
| *B82Y 40/00* | (2011.01) |

(52) U.S. Cl.
CPC ................. *D01F 1/10* (2013.01); *D01D 5/08* (2013.01); *D01D 5/26* (2013.01); *D01F 6/62* (2013.01); *B82Y 30/00* (2013.01); *B82Y 40/00* (2013.01)

(58) Field of Classification Search
CPC .... D01F 1/10; D01F 6/62; D01D 5/08; D01D 5/26; B82Y 30/00; B82Y 40/00
USPC .......................................................... 264/211
See application file for complete search history.

(56) References Cited

U.S. PATENT DOCUMENTS

| | | | | |
|---|---|---|---|---|
| 2006/0160448 | A1* | 7/2006 | Abraham | ................ A61L 15/30 264/211 |
| 2012/0237576 | A1* | 9/2012 | Gordon | .................. A61Q 19/00 510/276 |

FOREIGN PATENT DOCUMENTS

CN 106400308 A * 2/2017

OTHER PUBLICATIONS

English translation of CN106400308 (Year: 2017).*

* cited by examiner

*Primary Examiner* — Jeffrey M Wollschlager
*Assistant Examiner* — Xue H Liu
(74) *Attorney, Agent, or Firm* — ANOVA LAW GROUP, PLLC

(57) ABSTRACT

A modified polyester staple fiber and a preparation method of the modified polyester staple fiber are provided. The modified polyester staple fiber contains a modified nano-composite material including an organic compound, the organic compound including one of tea polyphenol, naringin, and emodin. The organic compound is in a weight percentage range of approximately 0.1%-5% based on a total weight of the modified polyester staple fiber.

10 Claims, No Drawings

MODIFIED POLYESTER STAPLE FIBER AND PREPARATION METHOD THEREOF

CROSS-REFERENCE TO RELATED APPLICATION

This application claims the priority of Chinese patent application No. 202010303564.8, filed on Apr. 17, 2020, the entirety of which is incorporated herein by reference.

FIELD OF THE DISCLOSURE

The present disclosure generally relates to the field of textile technology and, more particularly, relates to a modified polyester staple fiber and a preparation method thereof.

BACKGROUND

Polyester staple fiber is a fiber obtained by spinning polyester (i.e., polyethylene terephthalate, abbreviated as PET and polymerized by purified terephthalic acid (PTA) and mono ethylene glycol (MEG)) into a bunch and cutting the bunch. Polyester fiber molecules are arranged neatly and tightly with high crystallinity and orientation, but are short of dyeable groups. Therefore, the dyeing of polyester fiber is substantially difficult, the dyeing equipment has substantially high requirements, and the treatment of three-wastes (waste gas, waste water and waste residues) is substantially difficult to be solved.

With the continuous development of society and the continuous improvement of people's living standards, people has put forward enhanced concerns on health. As a type of material that people often come into contact with in daily life, textiles have received more and more attention for their hygienic performance. Due to the widespread existence of bacteria and other microorganisms, textiles easily become a breeding ground for bacteria during the processes of use, storage, and transportation, etc. Because polyester fiber molecules have symmetrical structure and tight arrangement, the polyester fiber has desired mechanical performance and chemical performance.

Tea polyphenol is a general term for polyphenols in tea. Tea polyphenol is a white amorphous powder and is easily soluble in water. Green tea has a substantially high content of tea polyphenol, which accounts for 15%-30% of mass of the green tea. The main components of tea polyphenol includes six types of compounds of flavanones, anthocyanins, flavonols, anthocyanins, phenolic acids and depsilic acids. Tea polyphenol has a substantially high content of flavanones, which account for 60%-80% of total mass of the tea polyphenol, followed by flavonoids. The contents of other phenols are substantially small. Tea polyphenol has a strong antibacterial effect and inhibit oxidase function.

Naringin is mainly found in the fruit of rutaceae plant pomelo, the peels and pulps of grapefruit, tangerine, and orange. Naringin is a pale yellow powder or off-white powder, and belongs to flavonoids. Naringin has anti-inflammatory, anti-viral, anti-cancer, anti-mutation, anti-allergic, anti-ulcer, analgesic, and lowering blood pressure functions. Naringin is capable of lowering blood cholesterol, reducing thrombus formation, and improving local microcirculation and nutritional supply, and can be used for prevention and treatment of cardiovascular and cerebrovascular diseases.

Emodin is an orange-yellow long needle-like crystal, which is orange when crystallized in acetone, and yellow when crystallized in methanol. Emodin has inhibitory effect on *Staphylococcus aureus* 209P, *Streptococcus, Bacillus diphtheriae, Bacillus subtilis, Bacillus paratyphi, Bacillus dysentery, Escherichia coli*, influenza bacillus, pneumococcus, and Catarrhal cocci, etc., and has a substantially strong inhibitory effect on common clinical anaerobic bacteria.

The existing polyester staple fiber cannot simultaneously meet the requirements of having desired antibacterial performance, mechanical performance, air permeability and moisture absorption performance. The disclosed methods and polyester staple fiber are directed to solve one or more problems set forth above and other problems.

BRIEF SUMMARY OF THE DISCLOSURE

One aspect of the present disclosure includes a modified polyester staple fiber. The modified polyester staple fiber contains a modified nanocomposite material including an organic compound, the organic compound including one of tea polyphenol, naringin, and emodin. The organic compound is in a weight percentage range of approximately 0.1%-5% based on a total weight of the modified polyester staple fiber.

In one embodiment, the modified nanocomposite material is formed by adding the organic compound into water to form a solution, and stirring the solution until the organic compound is fully dissolved; and adding a porous nanomaterial into the solution to form a mixture, and stirring the mixture to obtain the modified nanocomposite material. The organic compound includes one of the tea polyphenol, the naringin, and the emodin.

In one embodiment, a mass ratio of the organic compound over the water is in a range of approximately 1:(5-10).

In one embodiment, when the organic compound is the naringin, the naringin is dissolved at a heated temperature in a range of approximately 50° C.-80° C.

In one embodiment, when the organic compound is the emodin, the emodin is dissolved by further adding sodium carbonate.

In one embodiment, the porous nanomaterial includes one or more of montmorillonite, zeolite powder, porous nano-$TiO_2$ microspheres, and porous nano-$SiO_2$ microspheres.

In one embodiment, a mass ratio of the organic compound over the porous nanomaterial is in a range of approximately 1:(5-10).

In one embodiment, a stirring speed for the mixture containing the porous nanomaterial is in a range of approximately 30 r/min-60 r/min, and a stirring duration is in a range of approximately 30 minutes-120 minutes.

Another aspect of the present disclosure includes a preparation method of a modified polyester staple fiber. The method includes modifying an organic compound to provide a modified nanocomposite material, the organic compound including one of tea polyphenol, naringin, and emodin. The method also includes preparing a composite modifier, by performing: adding a fat-soluble solvent into the modified nanocomposite material, and grinding the modified nanocomposite material to provide the composite modifier. Further, the method includes preparing the polyester staple fiber, by performing: melt-mixing polyethylene terephthalate chips in a twin-screw extruder, adding the composite modifier into the twin-screw extruder, mixing the composite modifier and a melt of the polyethylene terephthalate chips, and spinning the mixed composite modifier and the melt of the polyethylene terephthalate chips to provide the modified polyester staple fiber.

In one embodiment, modifying the organic compound includes: adding the organic compound into water to form a solution, and stirring the solution until the organic compound is fully dissolved; and adding a porous nanomaterial into the solution to form a mixture, and stirring the mixture to provide the modified nanocomposite material.

In one embodiment, the fat-soluble solvent includes one or more of wax, high-grade fatty acid glyceride, and stearic acid.

In one embodiment, grinding the modified nanocomposite material includes a grinding particle size in a range of approximately 8000 mesh-10000 mesh.

In one embodiment, a mass ratio of the organic compound over the water is in a range of approximately 1:(5-10).

In one embodiment, when the organic compound is the naringin, the naringin is dissolved at a heated temperature in a range of approximately 50° C.-80° C.

In one embodiment, when the organic compound is the emodin, the emodin is dissolved by further adding sodium carbonate.

In one embodiment, the porous nanomaterial includes one or more of montmorillonite, zeolite powder, porous nano-$TiO_2$ microspheres, and porous nano-$SiO_2$ microspheres.

In one embodiment, a mass ratio of the organic compound over the porous nanomaterial is in a range of approximately 1:(5-10).

In one embodiment, a stirring speed for the mixture containing the porous nanomaterial is in a range of approximately 30 r/min-60 r/min, and a stirring duration is in a range of approximately 30 minutes-120 minutes.

Another aspect of the present disclosure includes a modified polyester staple fiber prepared by the above-disclosed method.

Other aspects of the present disclosure can be understood by those skilled in the art in light of the description, the claims, and the drawings of the present disclosure.

DETAILED DESCRIPTION

To make the objectives, technical solutions and advantages of the present disclosure clearer and more explicit, the present disclosure is described in further detail with accompanying embodiments. It should be understood that the specific exemplary embodiments described herein are only for explaining the present disclosure and are not intended to limit the present disclosure.

Various embodiments provide a modified polyester staple fiber and its preparation method. The modified polyester staple fiber may contain a modified nanocomposite material. The modified nanocomposite material may include an organic compound. The organic compound may include one or more of tea polyphenol, naringin, and emodin. The organic compound may be in a weight percentage range of approximately 0.1%-5% based on a total weight of the modified polyester staple fiber.

For preparing the modified polyester staple fiber, the organic compound may be modified to provide a modified nanocomposite material. A composite modifier may be prepared by, for example, adding a fat-soluble solvent into the modified nanocomposite material (e.g., for absorbing the fat-soluble solvent into the modified nanocomposite material), followed by grinding the modified nanocomposite material to provide the composite modifier. For preparing the polyester staple fiber, when melt-mixing polyethylene terephthalate chips in a twin-screw extruder, the composite modifier is added into the twin-screw extruder for mixing the composite modifier and a melt of the polyethylene terephthalate chips. The mixed composite modifier and the melt of the polyethylene terephthalate chips may be spun into the modified polyester staple fiber.

Exemplary Embodiment 1

The present disclosure provides a tea polyphenol-modified polyester staple fiber. The tea polyphenol-modified polyester staple fiber may contain tea polyphenol in a weight percentage of approximately 0.1%. Modifying tea polyphenol may include: adding tea polyphenol into water to form a solution, and stirring the solution until the tea polyphenol is fully dissolved, where a mass ratio of the tea polyphenol over water may be approximately 1:5; adding porous nano-$TiO_2$ microspheres into the solution to form a mixture, where a mass ratio of the tea polyphenol over the porous nano-$TiO_2$ microspheres may be approximately 1:5; and stirring the mixture at a speed of approximately 30 r/min for approximately 120 minutes, to obtain a modified nanocomposite material. In other words, the modified nanocomposite material may include an organic compound, and the organic compound may include tea polyphenol.

The preparation method of the tea polyphenol-modified polyester staple fiber may include following.

(1) Preparation of a composite modifier: adding an appropriate amount of wax into the modified nanocomposite material, and grinding the modified nanocomposite material with a grinding particle size of approximately 8000 mesh, to obtain the composite modifier.

(2) Preparation of the modified polyester staple fiber: melt-mixing PET chips in a twin-screw extruder; adding the composite modifier into the twin-screw extruder by injecting, to be mixed with melt of the PET chips, where a mass ratio of the composite modifier over the PET chips may be approximately 1:100; and obtaining the tea polyphenol-modified polyester staple fiber by spinning the mixed composite modifier and the melt of the PET chips.

Exemplary Embodiment 2

The present disclosure provides a tea polyphenol-modified polyester staple fiber. The tea polyphenol-modified polyester staple fiber may contain tea polyphenol in a weight percentage of approximately 2.5%. Modifying tea polyphenol may include: adding tea polyphenol into water to form a solution, and stirring the solution until the tea polyphenol is fully dissolved, where a mass ratio of the tea polyphenol over water may be approximately 1:7.5; adding porous nano-$SiO_2$ microspheres into the solution to form a mixture, where a mass ratio of the tea polyphenol over the porous nano-$SiO_2$ microspheres may be approximately 1:7.5; and stirring the mixture at a speed of approximately 45 r/min for approximately 75 minutes, to obtain a modified nanocomposite material. In other words, the modified nanocomposite material may include an organic compound, and the organic compound may include tea polyphenol.

The preparation method of the tea polyphenol-modified polyester staple fiber may include following.

(1) Preparation of a composite modifier: adding an appropriate amount of high-grade fatty acid glyceride into the modified nanocomposite material, and grinding the modified nanocomposite material with a grinding particle size of approximately 9000 mesh, to obtain the composite modifier.

(2) Preparation of the modified polyester staple fiber: melt-mixing PET chips in a twin-screw extruder; adding the composite modifier into the twin-screw extruder by injecting, to be mixed with melt of the PET chips, where a mass ratio of the composite modifier over the PET chips may be approximately 4.5:100; and obtaining the tea polyphenol-modified polyester staple fiber by spinning the mixed composite modifier and the melt of the PET chips.

Exemplary Embodiment 3

The present disclosure provides a tea polyphenol-modified polyester staple fiber. The tea polyphenol-modified polyester staple fiber may contain tea polyphenol in a weight percentage of approximately 5%. Modifying tea polyphenol may include: adding tea polyphenol into water to form a solution, and stirring the solution until the tea polyphenol is fully dissolved, where a mass ratio of the tea polyphenol over water may be approximately 1:10; adding montmorillonite and porous nano-$SiO_2$ microspheres into the solution to form a mixture, where a mass ratio of the tea polyphenol over the montmorillonite and the porous nano-$SiO_2$ microspheres may be approximately 1:10, and a mass ratio of the montmorillonite over the porous nano-$SiO_2$ microspheres may be approximately 1:1; and stirring the mixture at a speed of approximately 60 r/min for approximately 30 minutes, to obtain a modified nanocomposite material. In other words, the modified nanocomposite material may include an organic compound, and the organic compound may include tea polyphenol.

The preparation method of the tea polyphenol-modified polyester staple fiber may include following.

(1) Preparation of a composite modifier: adding an appropriate amount of stearic acid into the modified nanocomposite material, and grinding the modified nanocomposite material with a grinding particle size of approximately 10000 mesh, to obtain the composite modifier.

(2) Preparation of the modified polyester staple fiber: melt-mixing PET chips in a twin-screw extruder; adding the composite modifier into the twin-screw extruder by injecting, to be mixed with melt of the PET chips, where a mass ratio of the composite modifier over the PET chips may be approximately 8:100; and obtaining the tea polyphenol-modified polyester staple fiber by spinning the mixed composite modifier and the melt of the PET chips.

Exemplary Embodiment 4

The present disclosure provides a naringin-modified polyester staple fiber. The naringin-modified polyester staple fiber may contain naringin in a weight percentage of approximately 0.1%. Modifying naringin may include: adding naringin into water to form a solution, and stirring the solution at a heated temperature of approximately 50° C. until the naringin is fully dissolved, where a mass ratio of the naringin over water may be approximately 1:5; and adding zeolite powder into the solution to form a mixture, where a mass ratio of the naringin over the zeolite powder may be approximately 1:5; and stirring the mixture at a speed of approximately 30 r/min for approximately 120 minutes, to obtain a modified nanocomposite material. In other words, the modified nanocomposite material may include an organic compound, and the organic compound may include naringin.

The preparation method of the naringin-modified polyester staple fiber may include following.

(1) Preparation of a composite modifier: adding an appropriate amount of wax into the modified nanocomposite material, and grinding the modified nanocomposite material with a grinding particle size of approximately 8000 mesh, to obtain the composite modifier.

(2) Preparation of the modified polyester staple fiber: melt-mixing PET chips in a twin-screw extruder; adding the composite modifier into the twin-screw extruder by injecting, to be mixed with melt of the PET chips, where a mass ratio of the composite modifier over the PET chips may be approximately 1:100; and obtaining the naringin-modified polyester staple fiber by spinning the mixed composite modifier and the melt of the PET chips.

Exemplary Embodiment 5

The present disclosure provides a naringin-modified polyester staple fiber. The naringin-modified polyester staple fiber may contain naringin in a weight percentage of approximately 2.5%. Modifying naringin may include: adding naringin into water to form a solution, and stirring the solution at a heated temperature of approximately 65° C. until the naringin is fully dissolved, where a mass ratio of the naringin over water may be approximately 1:7.5; and adding porous nano-$SiO_2$ microspheres into the solution to form a mixture, where a mass ratio of the naringin over the porous nano-$SiO_2$ microspheres may be approximately 1:7.5; and stirring the mixture at a speed of approximately 45 r/min for approximately 75 minutes, to obtain a modified nanocomposite material. In other words, the modified nanocomposite material may include an organic compound, and the organic compound may include naringin.

The preparation method of the naringin-modified polyester staple fiber may include following.

(1) Preparation of a composite modifier: adding an appropriate amount of high-grade fatty acid glyceride into the modified nanocomposite material, and grinding the modified nanocomposite material with a grinding particle size of approximately 9000 mesh, to obtain the composite modifier.

(2) Preparation of the modified polyester staple fiber: melt-mixing PET chips in a twin-screw extruder; adding the composite modifier into the twin-screw extruder by injecting, to be mixed with melt of the PET chips, where a mass ratio of the composite modifier over the PET chips may be approximately 4.5:100; and obtaining the naringin-modified polyester staple fiber by spinning the mixed composite modifier and the melt of the PET chips.

Exemplary Embodiment 6

The present disclosure provides a naringin-modified polyester staple fiber. The naringin-modified polyester staple fiber may contain naringin in a weight percentage of approximately 5%. Modifying naringin may include: adding naringin into water to form a solution, and stirring the solution at a heated temperature of approximately 80° C. until the naringin is fully dissolved, where a mass ratio of the naringin over water may be approximately 1:10; and adding montmorillonite and porous nano-$SiO_2$ microspheres into the solution to form a mixture, where a mass ratio of the naringin over the montmorillonite and the porous nano-$SiO_2$ microspheres may be approximately 1:10, and a mass ratio of the montmorillonite over the porous nano-$SiO_2$ microspheres may be approximately 1:1; and stirring the mixture at a speed of approximately 60 r/min for approximately 30 minutes, to obtain a modified nanocomposite material. In other words, the modified nanocomposite material may include an organic compound, and the organic compound may include naringin.

The preparation method of the naringin-modified polyester staple fiber may include following.

(1) Preparation of a composite modifier: adding an appropriate amount of stearic acid into the modified nanocomposite material, and grinding the modified nanocomposite material with a grinding particle size of approximately 10000 mesh, to obtain the composite modifier.

(2) Preparation of the modified polyester staple fiber: melt-mixing PET chips in a twin-screw extruder; adding the composite modifier into the twin-screw extruder by injecting, to be mixed with melt of the PET chips, where a mass ratio of the composite modifier over the PET chips may be approximately 8:100; and obtaining the naringin-modified polyester staple fiber by spinning the mixed composite modifier and the melt of the PET chips.

Exemplary Embodiment 7

The present disclosure provides an emodin-modified polyester staple fiber. The emodin-modified polyester staple fiber may contain emodin in a weight percentage of approximately 0.1%. Modifying emodin may include: adding emodin and an appropriate amount of sodium carbonate into water to form a solution, and stirring the solution until the emodin is fully dissolved, where a mass ratio of the emodin over water may be approximately 1:5; adding porous nano-$TiO_2$ microspheres into the solution to form a mixture, where a mass ratio of the emodin over the porous nano-$TiO_2$ microspheres may be approximately 1:5; and stirring the mixture at a speed of approximately 30 r/min for approximately 120 minutes, to obtain a modified nanocomposite material. In other words, the modified nanocomposite material may include an organic compound, and the organic compound may include emodin.

The preparation method of the emodin-modified polyester staple fiber may include following.

(1) Preparation of a composite modifier: adding an appropriate amount of high-grade fatty acid glyceride into the modified nanocomposite material, and grinding the modified nanocomposite material with a grinding particle size of approximately 8000 mesh, to obtain the composite modifier.

(2) Preparation of the modified polyester staple fiber: melt-mixing PET chips in a twin-screw extruder; adding the composite modifier into the twin-screw extruder by injecting, to be mixed with melt of the PET chips, where a mass ratio of the composite modifier over the PET chips may be approximately 1:100; and obtaining the emodin-modified polyester staple fiber by spinning the mixed composite modifier and the melt of the PET chips.

Exemplary Embodiment 8

The present disclosure provides an emodin-modified polyester staple fiber. The emodin-modified polyester staple fiber may contain emodin in a weight percentage of approximately 2.5%. Modifying emodin may include: adding emodin and an appropriate amount of sodium carbonate into water to form a solution, and stirring the solution until the emodin is fully dissolved, where a mass ratio of the emodin over water may be approximately 1:7.5; adding porous nano-$SiO_2$ microspheres into the solution to form a mixture, where a mass ratio of the emodin over the porous nano-$SiO_2$ microspheres may be approximately 1:7.5; and stirring the mixture at a speed of approximately 45 r/min for approximately 75 minutes, to obtain a modified nanocomposite material. In other words, the modified nanocomposite material may include an organic compound, and the organic compound may include emodin.

The preparation method of the emodin-modified polyester staple fiber may include following.

(1) Preparation of a composite modifier: adding an appropriate amount of stearic acid into the modified nanocomposite material, and grinding the modified nanocomposite material with a grinding particle size of approximately 9000 mesh, to obtain the composite modifier.

(2) Preparation of the modified polyester staple fiber: melt-mixing PET chips in a twin-screw extruder; adding the composite modifier into the twin-screw extruder by injecting, to be mixed with melt of the PET chips, where a mass ratio of the composite modifier over the PET chips may be approximately 4.5:100; and obtaining the emodin-modified polyester staple fiber by spinning the mixed composite modifier and the melt of the PET chips.

Exemplary Embodiment 9

The present disclosure provides an emodin-modified polyester staple fiber. The emodin-modified polyester staple fiber may contain emodin in a weight percentage of approximately 5%. Modifying emodin may include: adding emodin and an appropriate amount of sodium carbonate into water to form a solution, and stirring the solution until the emodin is fully dissolved, where a mass ratio of the emodin over water may be approximately 1:10; adding montmorillonite and porous nano-$SiO_2$ microspheres into the solution to form a mixture, where a mass ratio of the emodin over the montmorillonite and the porous nano-$SiO_2$ microspheres may be approximately 1:10, and a mass ratio of the montmorillonite over the porous nano-$SiO_2$ microspheres may be approximately 1:1; and stirring the mixture at a speed of approximately 60 r/min for approximately 30 minutes, to obtain a modified nanocomposite material. In other words, the modified nanocomposite material may include an organic compound, and the organic compound may include emodin.

The preparation method of the emodin-modified polyester staple fiber may include following.

(1) Preparation of a composite modifier: adding an appropriate amount of high-grade fatty acid glyceride into the modified nanocomposite material, and grinding the modified nanocomposite material with a grinding particle size of approximately 10000 mesh, to obtain the composite modifier.

(2) Preparation of the modified polyester staple fiber: melt-mixing PET chips in a twin-screw extruder; adding the composite modifier into the twin-screw extruder by injecting, to be mixed with melt of the PET chips, where a mass ratio of the composite modifier over the PET chips may be approximately 8:100; and obtaining the emodin-modified polyester staple fiber by spinning the mixed composite modifier and the melt of the PET chips.

Comparative Embodiment 10

Embodiment 10 for preparing the tea polyphenol-modified polyester staple fiber may be based on the above described exemplary Embodiment 1, except that the tea polyphenol may not be modified.

Comparative Embodiment 11

Embodiment 11 for preparing the tea polyphenol-modified polyester staple fiber may be based on the above described exemplary Embodiment 1, except that the modified nanocomposite material may be directly ground without adding the fat-soluble solvent.

Comparative Embodiment 12

Embodiment 12 for preparing the tea polyphenol-modified polyester staple fiber may be based on the above described exemplary Embodiment 1, except that the composite modifier may not be prepared, and the PET chips and the modified nanocomposite material may be directly melt-mixed to prepare the polyester staple fiber.

Antibacterial rates of the polyester staple fibers in exemplary Embodiments 1-9 and comparative Embodiments 10-12 may be tested, and the results may be shown in Table 1.

TABLE 1

| | Antibacterial rate (%) | | |
|---|---|---|---|
| Embodiments | Staphylococcus aureus | Escherichia coli | Candida albicans |
| Embodiment 1 | 95.6 | 98.5 | 97.1 |
| Embodiment 2 | 97.8 | 99.6 | 98.5 |
| Embodiment 3 | 96.3 | 98.1 | 97.6 |
| Embodiment 4 | 96.4 | 97.9 | 98.1 |
| Embodiment 5 | 97.3 | 99.1 | 98.8 |
| Embodiment 6 | 96.8 | 98.2 | 98.2 |
| Embodiment 7 | 96.9 | 98.3 | 98.7 |
| Embodiment 8 | 98.1 | 99.2 | 99.1 |
| Embodiment 9 | 97.4 | 97.9 | 98.2 |
| Embodiment 10 | 71.3 | 60.3 | 68.2 |
| Embodiment 11 | 70.2 | 58.9 | 65.9 |
| Embodiment 12 | 69.8 | 57.4 | 64.9 |

According to the results in Table 1, the polyester staple fibers in the present disclosure may have better antibacterial performance than the polyester staple fibers in comparative Embodiments 10-12. Because in the modification treatment, the porous nanomaterial has a substantially large specific surface area, the porous nanomaterial may encapsulate the tea polyphenol in pores of the porous nanomaterial, such that the composition of the tea polyphenol may not be destroyed when subsequently preparing the polyester staple fiber, thereby improving the antibacterial performance of the polyester staple fiber. The antibacterial performance of polyester staple fibers prepared without adding the fat-soluble solvent and without preparing the composite modifier may be significantly reduced, which may be due to the uneven dispersion of the tea polyphenol in the polyester staple fiber. The performance of the polyester staple fibers in the present disclosure may be uniform. After being washed 50 times, the antibacterial rate of the modified polyester staple fiber may still meet the standard requirements.

The above test may also be performed on the polyester staple fiber in any other disclosed embodiment, and the results are basically consistent, which may not be listed one by one.

The mechanical performance, moisture absorption performance and air permeability of the polyester staple fibers in exemplary Embodiments 1-9 and comparative Embodiments 10-12 may be tested, and the results may be shown in Table 2.

According to the results in Table 2, the polyester staple fiber prepared by the disclosed preparation method may have desired mechanical performance, air permeability and moisture regain.

The above test may also be performed on the polyester staple fiber in any other disclosed embodiment, and the results are basically consistent, which may not be listed one by one.

TABLE 2

| Embodiments | Air permeability ($m^3/m^2 \cdot s$) | Elongation (%) | Moisture regain (%) |
|---|---|---|---|
| Embodiment 1 | 416 | 4.9 | 0.89 |
| Embodiment 2 | 425 | 5.2 | 0.82 |
| Embodiment 3 | 419 | 4.8 | 0.80 |
| Embodiment 4 | 421 | 5.1 | 0.83 |
| Embodiment 5 | 426 | 5.3 | 0.85 |
| Embodiment 6 | 424 | 5.0 | 0.80 |
| Embodiment 7 | 419 | 5.3 | 0.81 |
| Embodiment 8 | 428 | 5.5 | 0.84 |
| Embodiment 9 | 423 | 5.1 | 0.82 |
| Embodiment 10 | 312 | 3.4 | 0.42 |
| Embodiment 11 | 314 | 3.0 | 0.45 |
| Embodiment 12 | 309 | 2.8 | 0.48 |

The present disclosure may have following beneficial effects. In the present disclosure, tea polyphenol, naringin or emodin may be modified using the porous nanomaterial. Because the porous nanomaterial has a substantially large specific surface area, the porous nanomaterial may encapsulate the tea polyphenol, naringin or emodin in the pores of the porous nanomaterial. Therefore, the composition of tea polyphenol, naringin or emodin may not be destroyed when subsequently preparing the polyester staple fiber, thereby improving the performance of the polyester staple fiber. Due to the addition of the tea polyphenol, naringin or emodin, the polyester staple fiber may have improved antibacterial performance, and may have desired antibacterial performance against *Staphylococcus aureus, Escherichia coli*, and *Candida albicans*. After being washed 50 times, the antibacterial rate of the modified polyester staple fiber may still meet the standard requirements.

In the present disclosure, the fat-soluble solvent may be added into the obtained modified nanocomposite material, and then the modified nanocomposite material may be ground, which may make the modified nanocomposite material be uniformly dispersed. The modified polyester staple fiber may be obtained by mixing the composite modifier with PET chips, and spinning, etc., and the mechanical performance, antibacterial performance, moisture absorption performance and air permeability of the polyester staple fiber may be improved.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A preparation method of a modified polyester staple fiber, comprising:
    modifying an organic compound to provide a modified nanocomposite material, the organic compound comprising one or more of tea polyphenol, naringin, and emodin, wherein modifying the organic compound includes:
        adding the organic compound into water to form a solution where the organic compound is fully dissolved; and adding a porous nanomaterial into the solution to form a mixture and stirring the mixture to form the modified nanocomposite material;

preparing a composite modifier, by performing: adding a fat-soluble solvent into the modified nanocomposite material, and grinding the modified nanocomposite material to provide the composite modifier; and preparing the polyester staple fiber, by performing:
- melt-mixing polyethylene terephthalate chips in a twin-screw extruder,
- adding the composite modifier into the twin-screw extruder,
- mixing the composite modifier and a melt of the polyethylene terephthalate chips, and
- spinning the mixed composite modifier and the melt of the polyethylene terephthalate chips to provide the modified polyester staple fiber.

2. The method according to claim 1, wherein:
the fat-soluble solvent includes one or more of wax, fatty acid glyceride, and stearic acid.

3. The method according to claim 1, wherein:
grinding the modified nanocomposite material includes a grinding particle size in a range of approximately 8000 mesh-10000 mesh.

4. The method according to claim 1, wherein:
a mass ratio of the organic compound over the water is in a range of approximately 1:(5-10).

5. The method according to claim 1, wherein:
when the organic compound is the naringin, the naringin is dissolved at a heated temperature in a range of approximately 50° C.-80° C.

6. The method according to claim 1, wherein:
when the organic compound is the emodin, the emodin is dissolved by further adding sodium carbonate.

7. The method according to claim 1, wherein:
the porous nanomaterial includes one or more of montmorillonite, zeolite powder, porous nano-$TiO_2$ microspheres, and porous nano-$SiO_2$ microspheres.

8. The method according to claim 7, wherein:
a mass ratio of the organic compound over the porous nanomaterial is in a range of approximately 1:(5-10).

9. The method according to claim 1, wherein:
a stirring speed for the mixture containing the porous nanomaterial is in a range of approximately 30 r/min-60 r/min, and a stirring duration is in a range of approximately 30 minutes-120 minutes.

10. The method according to claim 7, wherein the organic compound is in a weight percentage range of approximately 0.1%-5% based on a total weight of the modified polyester staple fiber.

* * * * *